United States Patent [19]

Hsiao

[11] 3,864,932
[45] Feb. 11, 1975

[54] SEA WATER DESALTING APPARATUS

[75] Inventor: Wan-Om Hsiao, New Kowloon, Kowloon, Hong Kong

[73] Assignee: Pioneer Science Limited, Kowloon, Hong Kong

[22] Filed: June 12, 1973

[21] Appl. No.: 369,353

[52] U.S. Cl. ................................ 62/123, 417/534
[51] Int. Cl. ............................................ B01d 9/04
[58] Field of Search ................ 62/57, 58, 123, 268; 417/534

[56] References Cited
UNITED STATES PATENTS

| | | | |
|---|---|---|---|
| 3,098,735 | 7/1963 | Clark | 62/123 X |
| 3,319,344 | 5/1967 | Sachsel et al. | 62/57 X |

Primary Examiner—Meyer Perlin
Assistant Examiner—Ronald C. Capossela
Attorney, Agent, or Firm—Dowell & Dowell

[57] ABSTRACT

Apparatus for treating sea water to separate potable water from the saline solution and recover the potable water. The apparatus includes a treating chamber maintained under subatmospheric pressure and into which sea water under pressure is introduced so that a substantial differential of pressure exists to cause the sea water to vaporize. Apparatus within the chamber separates potable water from saline water and collects the potable water while the saline water is discharged.

9 Claims, 11 Drawing Figures

PATENTED FEB 11 1975

SEA WATER DESALTING APPARATUS

BACKGROUND OF THE INVENTION

1. Field of the Invention

The present invention relates generally to water desalination and relates particularly to a small desalting apparatus having limited capacity with limited power requirements which separates potable water from saline water.

2. Description of the Prior Art

Although approximately 70 percent of the earth's surface is covered with water, most of such water has a high saline content and therefore has been of little use either for consumption by humans and animals or for irrigation purposes. Until the present century, the natural water cycle has been sufficient to comfortably sustain most of the peoples of the earth. With the increase in population throughout the world and its attendant increase in pollution, the problems of providing sufficient potable water for the population have increased significantly. Many areas have maintained substandard living conditions due to the lack of potable water, even though they border on the sea or on large bodies of salt or brackish water.

Many efforts have been made to provide an economical method and apparatus for converting water having a high saline content to potable water; however, usually such efforts have not been economically feasible. As an example, it is well known that salt water can be purified by a distillation process; however, the power requirements for converting the salt water to steam and condensing the vapor have been too expensive and the quantity of potable water recovered has not been worth the cost of producing the same.

Many efforts have been made to provide an economical apparatus for separating potable water from saline water by subjecting sea water to refrigeration equipment so that the salt-free water freezes and forms ice crystals which can then be separated from the unfrozen salt water and the temperature of the crystals raised to melt the crystals and thereby produce potable water. Some examples of this type of structure are the U.S. Pat. Nos. to Zarchin 2,821,304; Johnson et al. 3,255,605; Ashley 3,501,924; and Cheng 3,667,243 and 3,690,116.

Other prior art devices have been provided for converting sea water to vapor in order to separate the potable water from the salt water and have included low temperature apparatus for condensing the vapor to recover the potable water. Some examples of this type of structure are the U.S. Pat. Nos. to Sephton 3,285,832 and Grow 3,505,171.

SUMMARY OF THE INVENTION

The present invention is an apparatus for separating potable water from salt water by forcing salt water under pressure through one or more spray nozzles to reduce the water to a fine mist or fog while introducing the same into a treatment chamber having a subatmospheric pressure or partial vacuum to permit potable water to be easily separated from salt water by crystallization in which the potable water is frozen into crystalline form or by condensing portions of the mist or fog to recover potable water.

It is an object of the invention to provide an apparatus for removing potable water from salt sea water and including a water treatment chamber which is maintained under a partial vacuum or subatmospheric pressure and into which salt water is introduced under pressure in such a manner that the droplets of salt water are atomized to a fine mist or fog from which potable water can be recovered.

DESCRIPTION OF THE PREFERRED EMBODIMENTS

Figure 1:
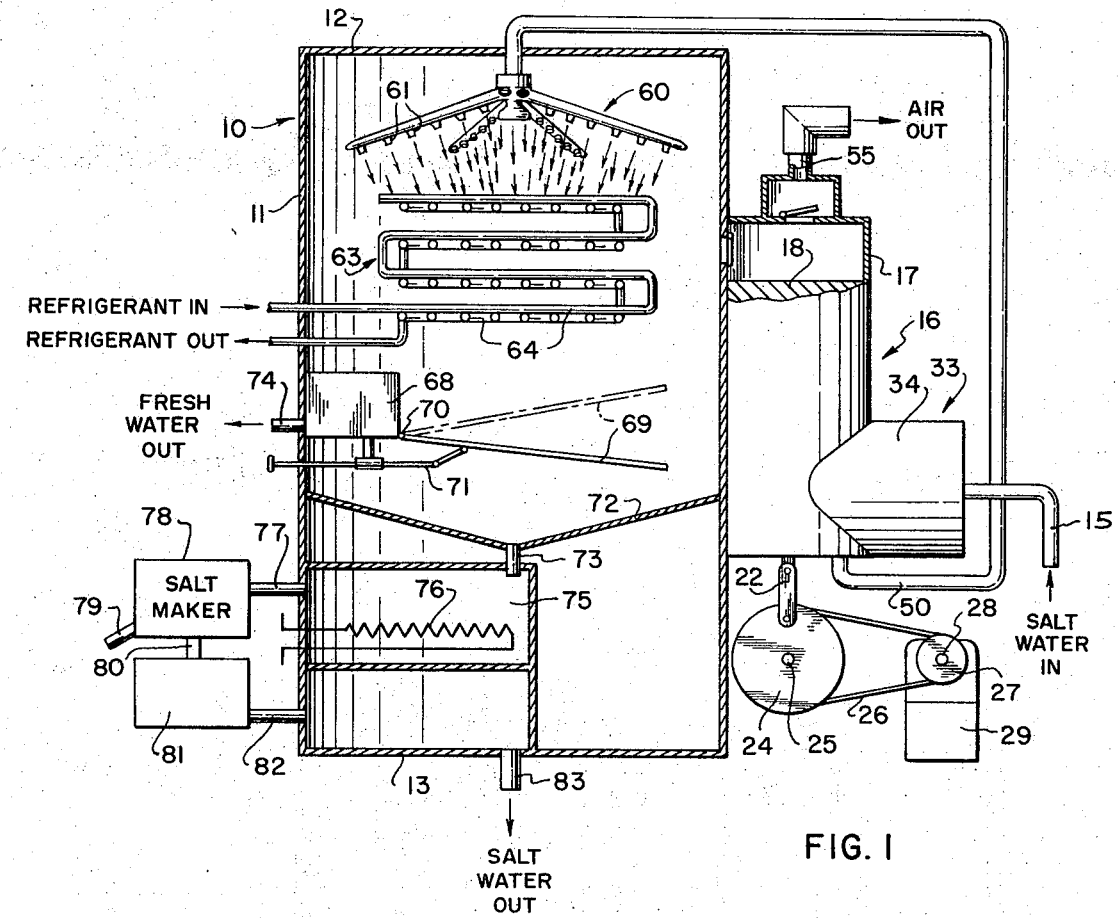
FIG. 1 is a schematic vertical section of a treating chamber in accordance with the present invention.

With continued reference to the drawings, a relatively small sea water desalting apparatus is provided including a chamber 10 having side walls 11, a top wall 12 and a bottom wall 13. The chamber 10 is of any desired size although a chamber having a volume of approximately 40 cubic feet has been found satisfactory. With reference to FIG. 1, water having a relatively high saline content, such as sea water or the like, is introduced into the apparatus from any suitable source through an inlet line 15 into a pump 16.

Figure 6:
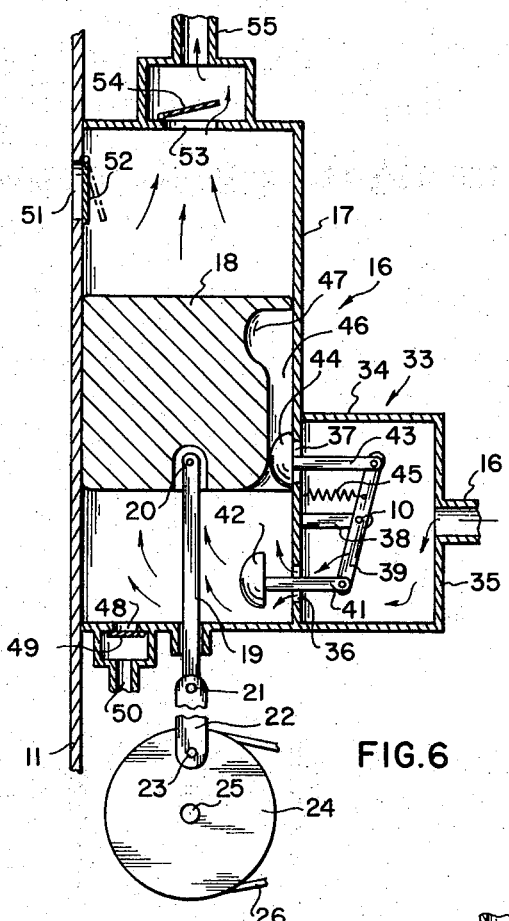
FIG. 6 is an enlarged section of a pump illustrating the piston in one extreme position.
Figure 8:
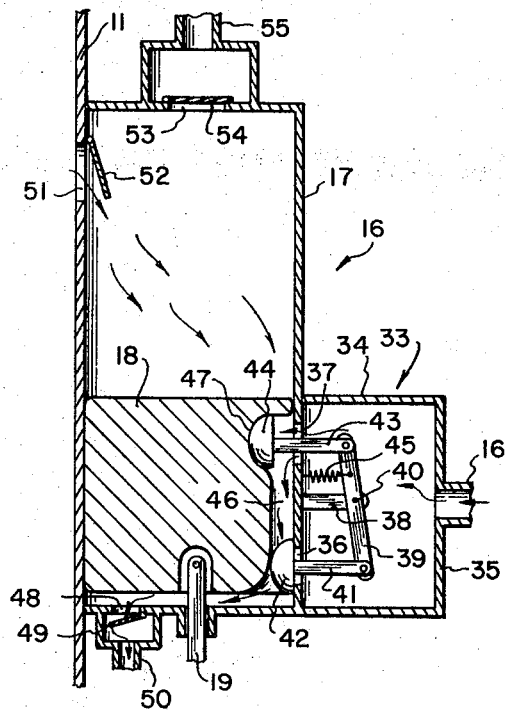
FIG. 8 is a section similar to FIG. 6 with the piston in another extreme position.
Figure 7:
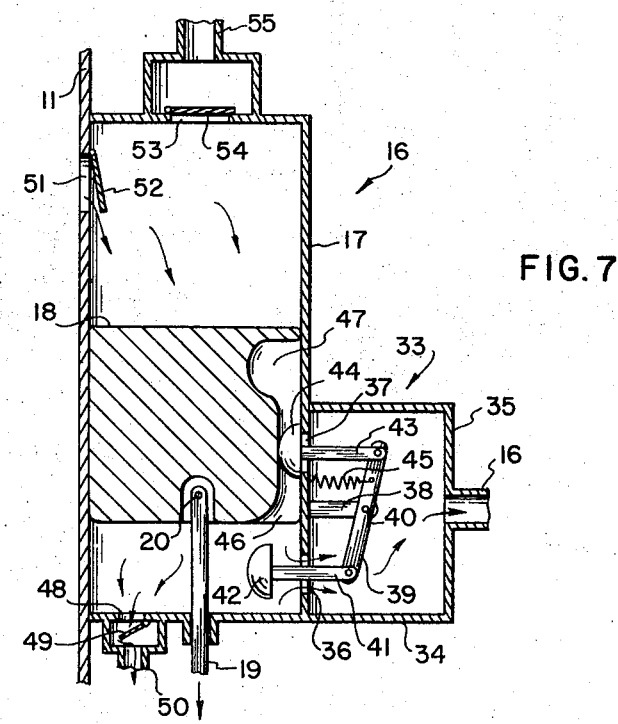
FIG. 7 is a section similar to FIG. 6 with the piston in an intermediate position.
Figure 9:
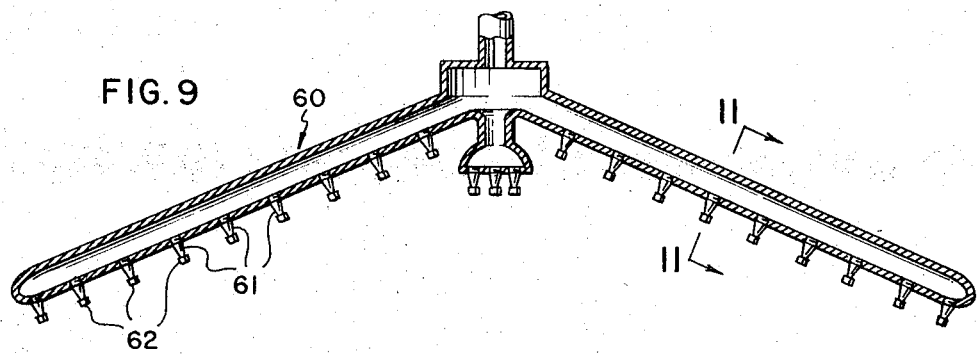
FIG. 9 is an enlarged vertical section through the spray head of the present invention.

As illustrated best in FIGS. 6–8, the pump includes a cylinder 17 mounted on one of the side walls 11 of the chamber 10 and such cylinder is provided with a piston 18 connected to one end of a rod 19 by a pin 20. The rod 19 extends through a gland at the bottom of the cylinder 17 and the opposite end of such rod is connected by a pin 21 to one end of a link 22. The opposite end of such link is eccentrically connected by a pivot 23 to a rotatable disk or pulley 24 which is fixed to a shaft 25. The disk 24 is rotated in any desired manner, as by a belt 26 which drivingly connects the disk 24 to a drive pulley 27 mounted on the shaft 28 of a power plant 29.

Adjacent to the lower end of the cylinder 17 is a compartment 33 having a side wall 34 and an end wall 35 to which the inlet 15 is connected so that sea water is introduced into the compartment 33. A pair of spaced vertically disposed openings 36 and 37 provide communication between the compartment 33 and the lower portion of the cylinder 17 to permit sea water to pass.

Within the compartment 33 a post 38 is provided on which a walking beam 39 is swingably mounted by a pivot pin 40 for movement in a generally vertical direction. The lower end of the beam 39 is swingably connected to a link 41 which extends through the lower opening 36 and is connected to a valve 42. The upper end of the beam 39 is swingably connected to a link 43 which extends through the upper opening 37 and is connected to a valve 44. A spring or other resilient member 45 is connected to the walking beam 39 between the post 38 and the link 43 to urge the lower valve 42 toward closed position and the upper valve 44 toward open position. Usually it is desirable to keep the lower valve 42 open and in order to do this the piston 18 is provided with a vertical slot 46 which is substantially arcuate in cross-section and extends from the bottom of the piston up the side thereof and terminates in a recess 47. Although not shown in the drawings, the upper end of the piston is provided with a seal which slidingly engages the inner wall of the cylinder 17 so that sea water does not pass above the piston 18.

The bottom of the cylinder 17 has a discharge opening 48 controlled by a one-way valve 49 and such opening communicates with a pressure line 50. The upper portion of the cylinder 17 has an opening 51 communicating with the interior of the chamber 10 and such upper opening is controlled by a one-way valve 52. During the down stroke of the piston 18, the valve 52 opens to draw air from the chamber 10 into the upper portion of the cylinder 17 and during the up stroke of the piston the valve 52 is closed. In order to exhaust air from the upper portion of the cylinder which has been introduced through the opening 51, an opening 53 is provided in the top of the cylinder 17 and such opening is controlled by a one-way valve 54 located within an air exhaust line 55.

With particular reference to FIGS. 6-8, when the piston 18 is in its lowermost position (FIG. 8), the lower valve 42 is closed and the upper valve 44 is open so that sea water flows through the upper opening 37 into the slot 46. During initial upward movement of the piston 18, the upper valve 44 is forced out of the recess 47 while simultaneously the lower valve 42 begins to open; however, the sea water within the slot 46 is discharged into the lower portion of the cylinder to prevent power loss resulting from a drag created by the formation of a vacuum. The initial upward movement of the piston closes valve 49 of the pressure line and the valve 52 which provides communication between the chamber 10 and the upper portion of the cylinder 17.

Continued upward movement of the piston causes the air in the upper portion of the cylinder to be compressed so that the valve 54 opens and exhausts the air through the line 55 to atmosphere. Simultaneously the lower water control valve 42 opens and permits sea water to flow from the compartment 33 into the lower portion of the cylinder 17 until the piston reaches the end of its upward stroke (FIG. 6).

During the downward movement of the piston, air exhaust valve 54 is closed, while the pressure valve 49 and the vacuum valve 52 are open. Downward movement of the piston creates a partial vacuum in the upper portion of the cylinder which draws air from the chamber 10 and creates a partial vacuum or subatmospheric pressure within the chamber. The lower portion of the cylinder 17 is substantially filled with sea water which is substantially incompressible and since the volume of water which can be forced through the pressure line 50 is limited, it is important that some of the sea water be returned to the compartment 33 so that the piston can be operated at a desired speed without excessive power requirements on the power plant 29.

As illustrated best in FIG. 7, during the downward movement of the piston, the upper water control valve 44 is disposed within the slot 46 and the lower water control valve 42 remains open so that part of the sea water contained within the lower portion of the cylinder is forced through pressure line 50 and part of such sea water is returned through the lower opening 36 into the compartment 33. As the piston approaches its lowermost position, the lower water control valve 42 closes when the upper water control valve 44 enters the recess 47 in the piston so that most of the water remaining in the lower portion of the cylinder 17 is forced through the pressure line 50.

Figure 10:
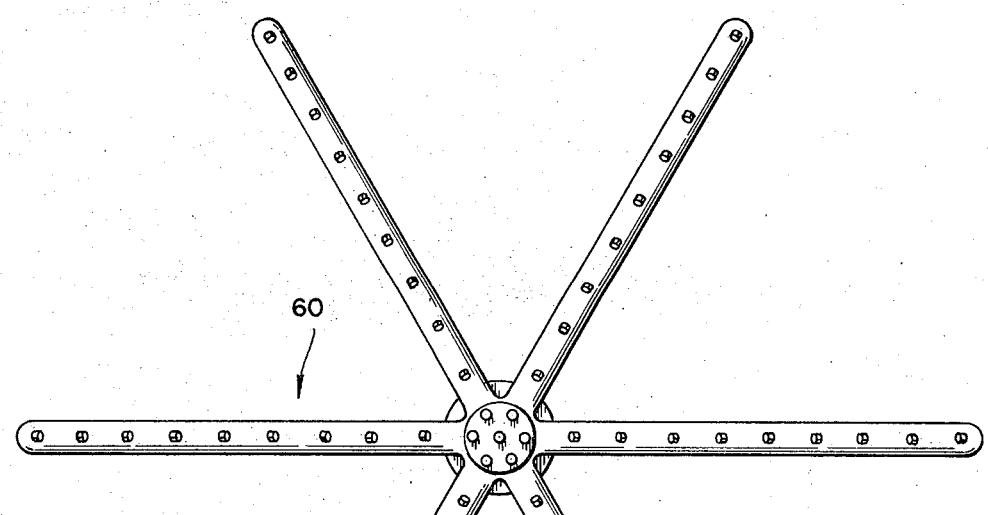
FIG. 10 is a plan view of the structure of FIG. 9.
Figure 11:
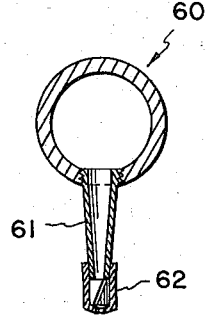
FIG. 11 is an enlarged section on the line 11—11 of FIG. 9.

With reference to FIG. 1, the pressure line 50 extends through the top wall 12 of the chamber 10 and is connected to a spray header 60 which may be generally conical in cross-section, as illustrated in FIG. 1, or may include a plurality of radial fingers, as illustrated in FIG. 10. The header 60 has a plurality of outwardly extending nipples 61 radiating from the center and the discharge end of each such nipples is provided with a spray nozzle 62 which atomizes the droplets of sea water when water under pressure is introduced thereinto. The atomized sea water under pressure is sprayed from the header 60 into the chamber 10 which is maintained under subatmospheric conditions as previously described. The substantial differential in pressure between the interior of the spray header 60 and the interior of the chamber 10 assists in reducing the atomized sea water to a fine mist or fog so that potable water can be separated more easily from the saline water.

Figure 2:
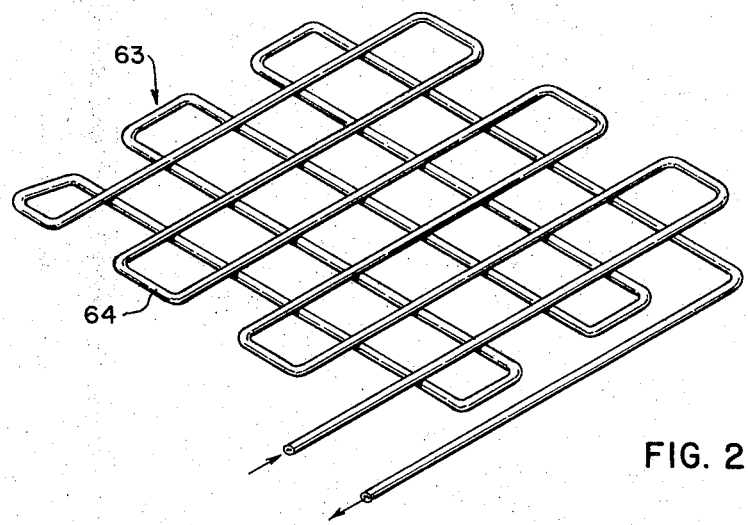
FIG. 2 is a fragmentary perspective of a portion of a temperature exchanger located within the chamber of FIG. 1.

Directly below the spray header 60 is mounted a refrigerant evaporator 63 including a continuous tube 64 through which a refrigerating medium flows. Preferably the tube 64 is arranged in a grid or screen having one or more tiers in which the tube is arranged in a serpentine path having a first plurality of generally parallel portions disposed in one direction and a second plurality of generally parallel portions disposed in a direction normal to the first portions, as illustrated in FIG. 2.

Any desired refrigerating equipment can be provided for forcing a refrigerant medium through the evaporator 63. This may include a direct system including a compressor, condenser and receiver, or an indirect system using a medium such as brine. Such system forces liquid refrigerant into the evaporator or heat exchanger in heat exchange relationship with the atomized sea water mist or fog. In a direct refrigerant system, the liquid refrigerant absorbs heat from the atomized sea water or fog as it changes to a gaseous state, and such gas is removed and compressed by the compressor and is introduced into the condenser where the gaseous refrigerant gives up its heat and is condensed to a liquid state and passes to the receiver for reintroduction into the evaporator 63. In an indirect refrigerant system, the refrigerating medium absorbs heat from the mist or fog and then passes through a heat exchanger where it gives up the heat before being reintroduced into the evaporator.

Within the chamber 10, the atomized sea water or fog is sprayed onto the refrigerant evaporator 63 where particles of water having a low saline content freeze on the evaporator, while the particles having higher saline content pass through the evaporator without freezing.

Below the evaporator 63, a heating element is contained within a housing 68 and such heating element is adapted to be operated intermittently. An adjustable baffle 69 is swingably mounted on the housing 68 in any desired manner as by a hinge 70 and an operating mechanism 71 is provided for tilting the baffle either upwardly or downwardly relative to the housing 68. During the freezing cycle when crystals of potable water are forming on the evaporator 63, the baffle 69 is tilted downwardly so that the saline water which passes through the evaporator is discharged into a sump 72 where it passes through a discharge line 73 and is discharged back to the sea or the saline water can be discharged into auxiliary equipment which will be described later.

When the tube 64 of the evaporator 63 is substantially coated with ice crystals, the introduction of sea water into the spray header 60 is interrupted and the baffle 69 is tilted to an upwardly inclined position after which relatively warm refrigerant or other substance is passed through the evaporator 63 to dislodge the ice crystals from the evaporator tube 64. The particles of ice fall by gravity onto the baffle 69 and slide into the heating element housing 68 where the ice is melted and changed to a liquid state as substantially pure potable water which is then discharged through an outlet line 74 to a holding tank (not shown). It is contemplated that a small amount of potable water could be sprayed onto the baffle 69 before the ice crystals are dislodged to flush any salt residue from the baffle.

If desired sea water from the sump 72 can be discharged into a concentrating heater 75 including a heating element 76 which raises the temperature of such sea water. Hot sea water passes from the concentrating heater through a line 77 to a conventional salt maker 78 which separates salt from the water and discharges the salt through a line 79 and discharges the water through a line 80 into a settling tank 81 where calcium and magnesium deposits are separated after which the waste water is discharged back to the sea through a discharge line 83.

Figure 3:
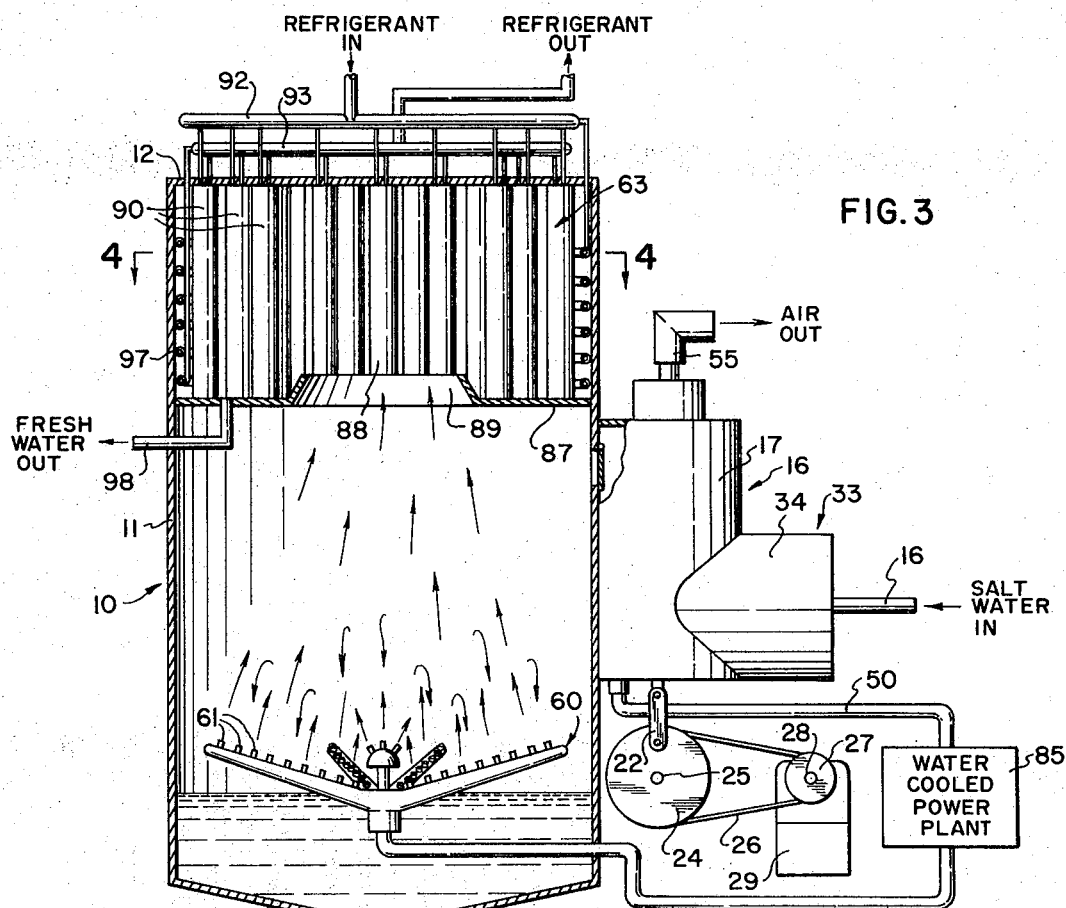
FIG. 3 is a schematic vertical section similar to FIG. 1 and illustrating a modified form of the invention.
Figure 4:
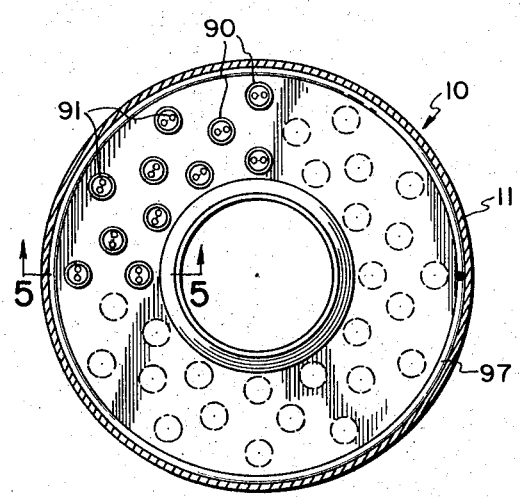
FIG. 4 is a section on the line 4—4 of FIG. 3.
Figure 5:
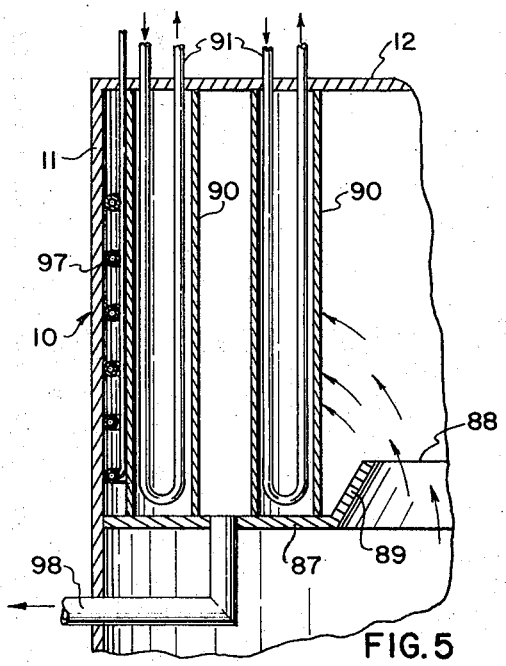
FIG. 5 is an enlarged section on the line 5—5 of FIG. 4.

With reference to FIGS. 3–5, a modified form of the invention is provided in which sea water under pressure is discharged from the cylinder 17 through the pressure line 50 to a water cooled power plant 85 such as the motor of a boat or the like where the water is heated and discharged through a pressure line 86 into a spray header 60 located in the lower portion of the chamber 10.

In this modification, the temperature of the sea water is raised to approximately 40°C by circulation through the power plant 85 and such heated sea water is sprayed from the header 60 in an atomized fog from a high pressure within the header to a subatmospheric pressure within the chamber 10. Heat from the power plant expands the sea water to assist in the atomizing process and causes the fine particles of mist or fog having a low saline content to surge upwardly into the upper portion of the chamber 10 while the heavier particles having a high saline content fall out of suspension by gravity into the lower portion of the chamber where the water is discharged through the discharge line 83.

In the upper portion of the chamber 10 a partition or collection pan 87 is provided having a central opening 88 defined by upwardly inclined generally frustoconical walls 89 to separate the chamber into upper and lower compartments. Within the upper compartment a plurality of imperforate hollow sleeves 90 extend downwardly from the top wall 12 of the chamber 10 to the partition 87 and within each of such sleeves is located a generally U-shaped refrigerating coil 91. The inlet end of each of the coils 91 is connected to an inlet header 92 and the outlet end of each of the coils is connected to an outlet header 93. The headers 92 and 93 are connected to a conventional source of direct refrigeration such as a compressor, condenser and receiver (not shown) for causing a refrigerant medium to flow through the coils 91, or an indirect system may be used.

In addition to the sleeves 90, it is contemplated that a refrigerating coil 97 could be located about the inner surface of the chamber 10 between the top wall 12 and the partition 87. Refrigerant medium flowing through the coils 91 and 97 chills the surfaces of the sleeves 90 and the coil 97 so that when the fog having a low saline content surges through the opening 88, such fog condenses on the surfaces of the chilled sleeves and gravitates to the top of the partition 87 as potable water. A fresh water outlet line 98 extends through the partition 87 and communicates with the upper compartment of the chamber 10 to discharge fresh water therefrom into a holding tank (not shown). It is noted that if desired the sleeves 90 could be filled with a brine solution to facilitate the absorbing of heat from the fog within the upper compartment.

In the operation of the device, salt water is introduced into the lower portion of the cylinder 17 of the pump 16 during the up stroke of the piston 18 while air within the upper portion of the cylinder is being compressed and discharged to atmosphere. During the down stroke of the piston 18, air within the chamber 10 is evacuated into the upper portion of the cylinder 17 while simultaneously the salt water within the lower portion of the cylinder is forced through the pressure line 50 into the spray header 60. If desired the salt water under pressure from the pump 16 can be diverted through the casing of the water cooled power plant 85 to raise the temperature of the salt water before such water is introduced into the spray header 60. Water under pressure within the header is sprayed through the nozzles 62 into the chamber 10 having a subatmospheric pressure which causes the droplets of water to be atomized and sprayed as a fine mist or fog into the chamber 10. Within the chamber the fog engages refrigerating apparatus which in one embodiment freezes the particles of fog having a low saline content into ice crystals on a refrigerant evaporator, and in another embodiment the refrigerant apparatus chills and condenses the fog having a low saline content. In both embodiments, the water having a low saline content is recovered, while the water having a high saline content is discharged back to the sea.

I claim:

1. Saline water desalting apparatus comprising a chamber, atomizing spray nozzle means located within said chamber, pump means having a housing with a piston reciprocably mounted therein, means for operating said piston, said housing having a first portion located above said piston and a second portion located below said piston, said first portion communicating with the interior of said chamber through a unidirectional valve for evacuating air from said chamber, means for introducing saline water into said second portion, said second portion communicating with said spray nozzle means for introducing saline water under pressure into said spray nozzle means so that said nozzle means sprays an atomized fog into said chamber, and temperature modifying means within said chamber for separating potable water from the atomized fog, whereby the upward stroke of said piston discharges air from said first portion to atmosphere and introduces saline water into said second portion, and the downward stroke of said piston discharges saline water under pressure from said second portion and draws air from said chamber into said first portion.

2. The structure of claim 1 in which said chamber has a volume of less than 50 cubic feet.

3. The structure of claim 1 in which said temperature modifying means includes a refrigerant evaporator for freezing potable water into ice crystals, and means for intermittently removing ice crystals from said evaporator.

4. The structure of claim 3 in which said evaporator includes a continuous tube arranged in the form of a grid with a plurality of generally parallel first portions disposed in a first direction and a plurality of generally parallel second portions disposed in a second direction substantially normal to the direction of said first portions.

5. The structure of claim 3 including means for collecting the ice crystals and recovering potable water.

6. The structure of claim 5 including means for melting the collected ice crystals.

7. The structure of claim 1 in which said spray nozzle means is located in the lower portion of said chamber, and said temperature modifying means includes a plurality of refrigerant coils located in the upper portion of said chamber for condensing potable water from said fog, and means for collecting the condensed potable water.

8. The structure of claim 7 including a partition having a generally central opening located between said spray nozzle means and said refrigerant coils, a plurality of imperforate sleeves extending from the upper portion of said chamber to said partition, and at least some of said refrigerant coils being located within said sleeves.

9. Saline water desalting apparatus comprising a chamber, pump means associated with said chamber, said pump means including a housing with piston means reciprocably mounted therein, said housing having a first portion communicating with the interior of said chamber through a unidirectional valve which permits flow of air from the chamber to said first portion, means for discharging air under pressure from the first portion of said housing, said housing having a second portion separated from said first portion by said piston means, means for introducing saline water into said second portion, a discharge line having one end communicating with the second portion of said housing, said piston means intermittently forcing the water from said second portion into said discharge line under pressure, the other end of said discharge line terminating within said chamber, means connected to the other end of said discharge line for atomizing the saline water under pressure and spraying the same into said chamber, and temperature modifying means in said chamber, whereby said pump means creates a subatmospheric pressure within said chamber and intermittently sprays atomized saline water into said chamber so that said temperature modifying means separates potable water from the saline water.

* * * * *